Figure 1:
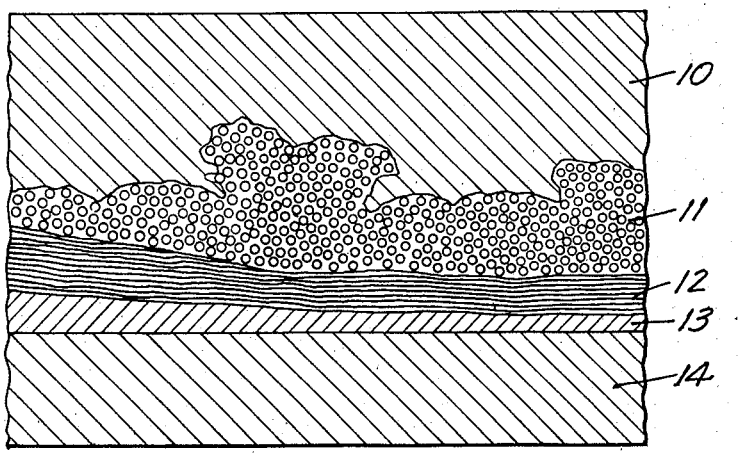

Oct. 11, 1960     R. A. SMITH     2,955,973
PERFLUOROCHLOROOLEFIN POLYMERS TO BASE MATERIALS
Filed Sept. 20, 1955

INVENTOR
RICHARD A. SMITH
BY
Carpenter, Abbott, Coulter & Kinney
ATTORNEYS

United States Patent Office 2,955,973
Patented Oct. 11, 1960

2,955,973

PERFLUOROCHLOROOLEFIN POLYMERS TO BASE MATERIALS

Richard A. Smith, Cornwall on the Hudson, N.Y., assignor, by mesne assignments, to Minnesota Mining and Manufacturing Company, St. Paul, Minn., a corporation of Delaware Filed Sept. 20, 1955, Ser. No. 535,477

11 Claims. (Cl. 154—128)

This invention relates to a method for preparing perfluorochloroolefin polymer laminates. In another of its aspects this invention relates to the lamination of perfluorochloroolefin polymers to fibrous base materials.

The high degree of chemical stability and the unusual physical characteristics of the perfluorochloroolefin polymers, has led to their wide use in a number of applications. However, the unusual properties of these materials has also made processing extremely difficult. Thus, when attempts have been made to use the perfluorochloroolefin polymers as coatings, their use in this respect has been seriously limited by their non-adhesive properties.

Because of the non-adhesive properties of the perfluorochloroolefins, the application of these polymers as coatings on various materials, such as metal, etc., has usually been achieved by the use of suitable laminates. Thus, polymers of trifluorochloroethylene have been extruded into films and the film has been pressed to a surface of a fabric material, for example, glass cloth. The opposite surface of the glass cloth, which is substantially free of polymer is then cemented to the desired object using adhesives. However, the quality of film prepared by the extrusion process, is not too good; the two stage heating step tends to degrade the polymer and, even more significant, the bond strength of the laminate thus produced is not as good as might be desired.

It is an object of this invention to provide a process for preparing laminates of the perfluorochloroolefin polymers to textile materials.

It is another object of this invention to improve the quality of perfluorochloroolefin polymer-textile laminates.

It is one of the more particular objects of this invention to provide a perfluorochloroolefin polymer laminate which can be bonded to various base materials, such as metals, e.g., copper, iron, steel, aluminum and brass, and to other solid base materials, such as glass and porcelain.

Various other objects and advantages will become apparent to those skilled in the art upon reading the accompanying description and disclosure.

Generally, the above objects are accomplished by distributing the perfluorochloroolefin polymer in particulate form over a surface of the textile to which the polymer is to be bonded and by heating the textile and polymer particles under pressure. The temperature and pressure employed, will vary depending upon the particular perfluorochloroolefin polymer that is employed, but should be sufficient so as to fuse the powder particles into a homogeneous mass.

As was indicated above, a perfluorochloroolefin polymer coating can be bonded to textile base material by the process of this invention. The perfluorochloroolefin polymers to which this invention is applicable, are prepared by polymerizing monomers, such as trifluorochloroethylene, dichlorodifluoroethylene (symmetrical and unsymmetrical) trichlorofluoroethylene, and to copolymers of the above perfluorochloroolefins copolymerized with other hydrogen containing halogenated olefins, such as vinyl chloride, vinylidene chloride, vinyl fluoride, vinylidene fluoride, etc. The invention is particularly applicable to the coating of base materials with homopolymers of trifluorochloroethylene having an N.S.T (no strength temperature) of at least 220° C., preferably at least 240° C. The term "polymer" as used herein, includes both homopolymers and copolymers.

Since the perfluorochloroolefin polymers are generally used where conditions are adverse, it will frequently be desirable to incorporate stabilizing agents in polymer coating. Representative of such stabilizers, are cadmium oxide and sulfide, zinc oxide, chromium oxide and sulfide, aluminum oxide, etc. Additionally, materials imparting a lubricating surface to the coating can be incorporated within the polymer. Graphite and molybdenum sulfide are representative of lubricants. For decorative purposes, and to conceal the base material, colored inorganic and organic pigments can be incorporated in the polymer coating.

The textile base materials to which the above described polymer coatings can be laminated, include the natural textiles, such as cotton, cotton duck, canvas and wool; the synthetic organic textiles, such as nylon, Orlon, etc. and the inorganic textiles, such as fiberglass. The fiberglass should not contain any sizing which decomposes at molding temperature, since discoloration of the laminates will result. It is preferred to employ specially treated fiberglass, such as heat-cleaned fiberglass which is prepared by burning off the sizing and glass cloths which have been treated with a chrome complex of stearic acid (commercially available as Volan) or with a silane (commercially available as Garan).

As indicated previously, the polymer powder is distributed over a surface of the textile to which it is to be bonded, and is then maintained at a temperature and pressure sufficient to fuse the polymer particles into a homogeneous mass. Temperature and pressure conditions required are generally those conditions suitable for molding the particular polymer involved. For example, in the case of homopolymers of trifluorochloroethylene, a temperature between about 230° C. and about 300° C. and a pressure between about 40 p.s.i. and 2500 p.s.i. is employed. In selecting temperature and pressure conditions, consideration must be given to the chemical characteristics, e.g., degradation temperature, of the textile to which the polymer is being bonded. When it is desirable to operate at relatively low temperatures, and adhesion aid is used. The adhesion aid serves to lower the temperature at which the particles fuse and also improves the adhesion of the polymer to the textile. Included among the adhesion aids, are the low molecular weight polymers of trifluorochloroethylene, i.e., the liquid polymers, and the normally solid copolymers of trifluorochloroethylene and vinylidene fluoride containing between about 20 and about 80 mole percent of trifluorochloroethylene. Normally, i.e., where low temperatures are not required, it is preferred to operate without an adhesion aid since the polymer layer of the laminate is then free of material which might affect its properties. In distributing the polymer particles over the surface of the textile, care should be exercised so as to achieve a relatively uniform distribution. A precisely uniform distribution is not necessary since a uniform film will form during the molding of the particles if they are reasonably well distributed at the start.

The particle size of the polymer powder will vary depending upon the mesh of the particular textile which forms a layer of the laminate. The particle size is such that the particles will penetrate into the interstices of the glass cloth and be retained therein without completely passing through the cloth. Since material in particulate form usually ranges in particle size, some of the particles may pass through the textile. However, these particles usually do not fuse to the bulk of the polymer and readily separate from the laminate. While one side of the textile is preferably completely free of polymer, the presence of an occasional and small area of polymer is not too objectionable. Generally, the particle size will range from about 20 mesh for the coarsely woven textiles to about 200 mesh for the finely woven textiles, and preferably from about 40 to about 60 mesh for the usual grade of relatively closely woven textile. The superior bond strength obtained by the use of the powder technique, as contrasted with laminates prepared by using a film, is due to the penetration of the polymer particles into the interstices of the fabric as the powder is being distributed over the surface of the textile. During the fusion process, these particles fuse to the layer of polymer with a subsequent anchorage of the polymer mass as the penetrated particles fuse to the bulk of the polymer.

The following examples are presented to illustrate the preparation of laminates by distributing a uniform layer of polymer particles over the surface of a textile as contrasted with laminates prepared by placing a film of polymer in contact with the textile, with subsequent heat and pressure.

Example I

Commercial glass cloth 0.7 mil thick was lightly coated with a solution of low molecular weight polytrifluorochloroethylene oil in methyl ethyl ketone. After the methyl ethyl ketone had evaporated, powdered polytrifluorochloroethylene molding powder (40 mesh) was sprinkled over the surface of the glass cloth and uniformly distributed. This powdered glass cloth was then placed in an Elmes press and heated at 170° C. at a pressure of 2500 pounds gage for about 20 minutes. The resulting laminate was clear with no evidence of discoloration. Adhesion was excellent.

Example II

Cotton duck (8 ounces) was wet with polytrifluorochloroethylene oil. Powdered polytrifluorochloroethylene (40 mesh) was applied uniformly over the surface of the cotton duck using a spatula. This material was then placed in a press for a total of 75 minutes at a temperature of 170° C. and a pressure of 45 pounds per square inch gage. A laminate approximately 30 mils in thickness was obtained. The laminate was electrically tight, and the adhesion was excellent.

Example III

A mixture of a homopolymer of trifluorochloroethylene (40 mesh) with 25 weight percent of low molecular weight polytrifluorochloroethylene (boiling point about 95° C. at 0.5 mm.) was mixed with methyl ethyl ketone to form a paste. This paste was spread over a glass cloth to form a layer of polymer particles approximately $\frac{1}{16}''$ in depth. The methyl ethyl ketone was allowed to evaporate after which the powdered glass cloth was pressed at 170° C. for 20 minutes at 1000 pounds per square inch gage. At this temperature, substantially all of the low molecular weight polytrifluorochloroethylene oil evaporated. An unplasticized polytrifluorochloroethylene-glass cloth laminate was obtained. The polymer film was firmly bonded to the glass cloth.

Example IV

A mixture of a homopolymer of trifluorochloroethylene and a copolymer of trifluorochloroethylene and vinylidene fluoride (75/25 mole ratio) was prepared, which contained approximately 5 weight percent of the copolymer. Approximately 30 mils of this powdered mixture was uniformly distributed over a surface of glass cloth. An Elmes press provided with 10 mil shims was used to press the powdered glass cloth. A 10 mil film on glass cloth was obtained by pressing for 20 minutes at 170° C. at 2500 pounds per square inch gage. The laminate was firmly bonded to the glass cloth.

Example V

Fiberglass cloth (finish 181–38–136) was covered uniformly with a homopolymer of trifluorochloroethylene in finely-divided form (40 mesh). The N.S.T. of the polymer was about 300. The powdered glass cloth was then heated in a press at 246° C. and 2500 pounds per square inch gage, for approximately 2 minutes; a firmly bonded laminate was produced.

Example VI

Commercial glass cloth (finish 181–38–136) was painted with a 10 percent solution of a copolymer of trifluorochloroethylene and vinylidene fluoride (75/25 mole ratio) in tetrahydrofuran. The tetrahydrofuran was evaporated. Powdered homopolymer of trifluorochloroethylene having an N.S.T. of about 300 was uniformly distributed over the surface of the glass cloth. The powdered glass cloth was pressed at 246° C. for 2 minutes at 2500 pounds per square inch gage. The adhesion of the resulting laminate was excellent.

Example VII

This example illustrates the superiority of laminates produced by starting with polymer in powder form as contrasted with powder in film-form.

A film of a homopolymer of trifluorochloroethylene having an N.S.T. of about 300 was prepared by compression molding polymer powder (equivalent to that used in Example VI) at 246° C. The film thus produced was quenched and dried. This film was then placed on commercial glass cloth (finish 181–38–136) which had been treated with a solution of a copolymer of trifluorochloroethylene and vinylidene fluoride (75/25 mole ratio) in tetrahydrofuran. The solution contained approximately 20 weight percent of the copolymer. The polymer film and the glass cloth were placed in a press and pressed at a temperature of 170° C. at 1000 pounds per square inch gage for 15 minutes. The adhesion was very poor and the polymer separated readily from the glass cloth leaving a pattern of the glass cloth clearly impressed on the mating surface of the polymer.

As indicated previously, the above described laminates can be used to prepare a variety of end products by adhering the textile layer of the laminate to other materials, such as metals, concrete, etc. The cement which is used to bond the laminate depends on the characteristics of the substrate. Representative general purpose adhesives are the epoxide resins, the phenolic resins and the various rubber cements, such as the neoprene based cements. Other commercially available adhesives can be employed depending only on the adhesiveness of the adhesive to the textile and of course to the substrate. The following examples illustrate the use of the above described laminates.

Example VIII

A homopolymer of trifluorochloroethylene (N.S.T. about 300) in finely-divided form, i.e., 40 mesh, was uniformly distributed over a surface of fiberglass cloth. The powder surfaced glass cloth was then pressed at 246° C. at 2500 pounds per square inch gage for 2 minutes. The resulting laminate had a polymer coating approximately 15 mils thick. This laminate was then cut into standard sized floor tiles (12" x 12"). The tiles thus produced, were cemented to a laboratory floor using standard mastic cement. The tiles have shown excellent resistance to wear with no evidence of delamination, etc.

*Example IX*

A laminate of a homopolymer of trifluorochloroethylene was prepared on glass cloth using the conditions described in Example VIII. A sheet approximately 24" x 24" was obtained. This sheet was cemented to a wooden table top using mastic cement. The table top has been used in a chemical laboratory with no signs of deterioration.

*Example X*

This example illustrates the use of the laminates of this invention as protective linings for steel tanks. In this example, the laminate, prepared as described in Example VIII, was bonded to steel using Epon VIII (an epoxide resin prepared by the condensation of bisphenol and epichlorohydrin). A section of this panel was polished in a Bakelite cylinder using standard metallurgical techniques. The photomicrograph of Figure 1 of the drawing shows a cross-section of the laminate in approximately 100 times magnification. In Figure 1 of the drawing, reference numeral 10 is the homopolymer of trifluorochloroethylene, reference numeral 11 is the fiberglass cloth showing the individual filaments of the cloth in a plane perpendicular to the plane of the drawing, reference numeral 12 is the fiberglass cloth showing the individual filaments of the cloth in a plane parallel to the plane of the drawing, reference numeral 13 is the Epon VIII (epoxide resin) and reference numeral 14 is the steel surface to which the laminate was bonded. The homopolymer of trifluorochloroethylene clearly penetrates the interstices of the glass fabric and is thus anchored to it. The laminate was firmly anchored to the steel surface.

The process of this invention can be carried out in a batchwise manner using standard presses and can also be carried out in a continuous manner. In a continuous operation the polymer particles are distributed over the glass cloth and the glass cloth and particles are then brought up to softening temperature by preheating with infra-red lamps, hot plates, etc., after which the glass cloth and particles are passed through a two roll press such as a Farrell-Birmingham press maintained under suitable conditions of temperature and pressure for the particular polymer involved. These conditions correspond to the molding temperature and pressure required for the individual polymer.

Various modifications and alterations of the process of this invention will be apparent to those skilled in the art and may be used without departing from the scope of this invention.

Having thus described my invention, I claim:

1. The method for providing a protective surface of a trifluorochloroethylene polymer on a relatively close textile fabric which comprises distributing particles of said polymer over the upper surface of said textile fabric to form a surface layer, said polymer particles being of a size such that some of said particles penetrate into the interstices of said textile fabric and thereafter subjecting the polymer particles under pressure of between about 40 and about 2500 pounds per square inch gauge to a temperature between about 230° C. and about 300° C. sufficient to fuse together said particles in situ in said interstices and to the surface layer of particles to form a homogeneous surface layer bonded to said textile fabric, thereby anchoring said surface layer to said textile fabric.

2. The method for providing a protective surface of a trifluorochloroethylene polymer having an N.S.T. value above about 220° C. on a relatively closely woven textile fabric which comprises distributing particles of said polymer over the upper surface of said textile fabric to form a surface layer, said polymer particles being of a size such that some of said particles penetrate into the interstices of said textile fabric and thereafter subjecting the polymer particles under pressure of between about 40 and about 2500 pounds per square inch gauge to a temperature between about 230° C. and about 300° C. sufficient to fuse together said particles in situ in said interstices and to the surface layer of particles to form a homogeneous surface layer bonded to said textile fabric, thereby anchoring said surface layer to said textile fabric.

3. The method of claim 2 wherein said textile fabric comprises natural fibers.

4. The method of claim 2 wherein said textile fabric is a synthetic organic textile.

5. The method of claim 2 wherein said textile fabric is an inorganic textile.

6. The method of claim 2 wherein said textile fabric is fiberglass.

7. A method for applying a protective surface of a polymer of trifluorochloroethylene to a substrate which comprises distributing particles of a polymer of trifluorochloroethylene have an N.S.T. above about 220° C. over the upper surface of a relatively closely woven fiberglass textile fabric to form a surface layer, said polymer particles being of a size such that some of said particles penetrate into the interstices of said textile fabric, thereafter subjecting the polymer particles to a temperature between about 230° C. and about 300° C. and a pressure between about 40 and about 2500 pounds per square inch gage, thereby fusing said particles into a polymer film anchored to said fiberglass and covering only one surface of said fiberglass, the opposite surface of said fiberglass being substantially free of said polymer, and interposing an adhesive between said opposite surface to the fiberglass and the substrate to which the protective polymer coating is to be bonded.

8. The method of claim 7 in which the substrate is steel.

9. A method for providing a protective surface of a trifluorochloroethylene polymer on a relatively closely woven textile fabric which comprises applying an adhesion aid onto the upper surface of said textile fabric, distributing particles of said polymer over the upper surface of said textile fabric to form a surface layer, said polymer particles being of a size such that some of the particles penetrate into the interstices of said textile fabric and thereafter subjecting the polymer particles under pressure of between about 40 and about 2500 pounds per square inch gauge to a temperature between about 230° C. and about 300° C., sufficient to fuse together said particles in situ in said interstices and to the surface layer of particles to form a homogeneous surface layer bonded to said textile fabric, thereby anchoring said surface layer to said fabric.

10. The method of claim 9 in which the adhesion aid comprises a low molecular weight polymer of trifluorochloroethylene.

11. A method for applying a protective surface of a polymer of trifluorochloroethylene to a relatively closely woven fiberglass textile fabric which comprises applying onto the upper surface of said fabric an adhesion aid selected from the group consisting of liquid low molecular weight polymers of trifluorochloroethylene and normally solid copolymers of trifluorochloroethylene and vinylidene fluoride having between about 20 and about 80 mole percent of trifluorochloroethylene, distributing particles of a polymer of trifluorochloroethylene having an N.S.T. above about 220° C. over a surface of said textile fabric to form a surface layer, said polymer particles being of a size such that some of said particles penetrate into the interstices of said textile fabric and thereafter subjecting the polymer particles under pressure of between about 40 and about 2500 pounds per square inch gauge to a temperature between about 230° C. and about 300° C., sufficient to fuse together said particles in situ in said interstices and to the surface layer of particles to form a homogeneous surface layer bonded to said textile fabric, thereby anchoring said surface layer to said textile fabric.

References Cited in the file of this patent

UNITED STATES PATENTS

| | | |
|---|---|---|
| 2,332,373 | Dorough et al. | Oct. 19, 1943 |
| 2,404,904 | Collins | July 30, 1946 |
| 2,427,183 | Berry | Sept. 9, 1947 |
| 2,600,202 | Caird | June 10, 1952 |
| 2,617,269 | Johnson | Nov. 11, 1952 |
| 2,658,849 | Lew | Nov. 10, 1953 |
| 2,686,738 | Teeters | Aug. 17, 1954 |
| 2,698,991 | Mesick | Jan. 11, 1955 |
| 2,719,093 | Voris | Sept. 27, 1955 |
| 2,728,698 | Rudner | Dec. 27, 1955 |
| 2,731,068 | Richards | Jan. 17, 1956 |

FOREIGN PATENTS

| | | |
|---|---|---|
| 665,638 | Great Britain | Jan. 30, 1952 |